Figure 1:
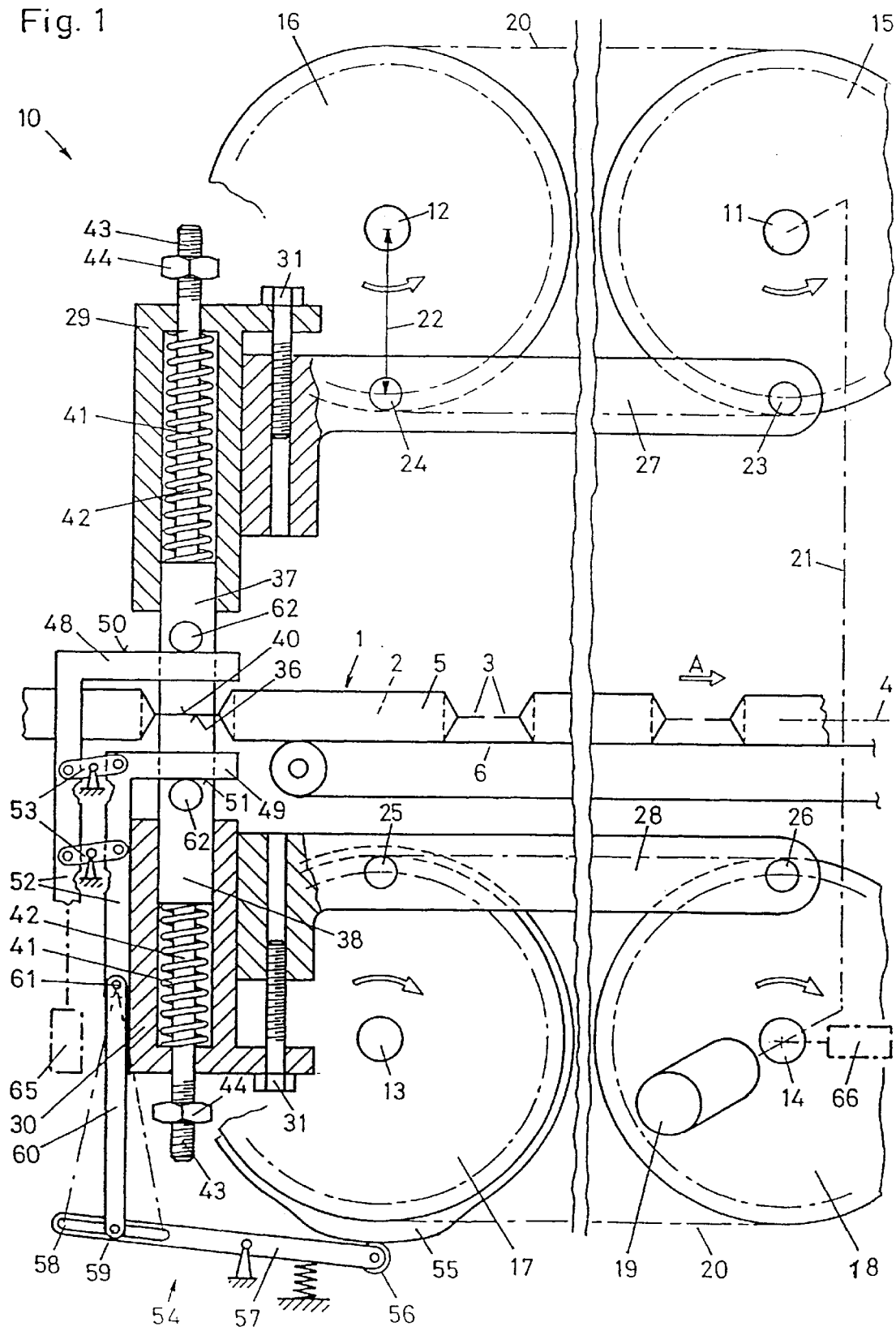

United States Patent [19]
Loewenthal

[11] Patent Number: 5,771,660
[45] Date of Patent: Jun. 30, 1998

[54] TRANSVERSE SEALING APPARATUS FOR A TUBULAR BAG PACKAGING MACHINE

[75] Inventor: Horst Loewenthal, Tiengen, Germany

[73] Assignee: SIG Schweizerische Industrie-Gesellschaft, Neuhausen am Rheinfall, Switzerland

[21] Appl. No.: 817,674

[22] PCT Filed: Dec. 1, 1995

[86] PCT No.: PCT/CH95/00285

§ 371 Date: Apr. 21, 1997

§ 102(e) Date: Apr. 21, 1997

[87] PCT Pub. No.: WO96/17720

PCT Pub. Date: Jun. 13, 1996

[30] Foreign Application Priority Data

Dec. 6, 1994 [CH] Switzerland ............................ 3696/94

[51] Int. Cl.[6] .............................. B65B 51/10; B65B 51/30
[52] U.S. Cl. ...................... 53/374.5; 53/374.6; 53/375.4; 53/550
[58] Field of Search ............................. 53/550, 551, 450, 53/451, 374.5, 374.6, 375.4

[56] References Cited

U.S. PATENT DOCUMENTS

| | | | |
|---|---|---|---|
| 2,467,879 | 4/1949 | Billeb . | |
| 4,120,235 | 10/1978 | Beck et al. . | |
| 4,141,196 | 2/1979 | Blanding | 53/374.6 |
| 4,433,527 | 2/1984 | Ramsey et al. | 53/374.5 |
| 4,563,860 | 1/1986 | Pfankuch | 53/374.6 |
| 5,271,210 | 12/1993 | Tolson | 53/550 |
| 5,371,999 | 12/1994 | Hansen et al. | 53/374.6 |
| 5,537,804 | 7/1996 | Tolson | 53/550 |
| 5,628,163 | 5/1997 | Keopple et al. | 53/374.5 |

FOREIGN PATENT DOCUMENTS

| | | |
|---|---|---|
| 0 308 861 | 3/1989 | European Pat. Off. . |
| 0 399 948 | 11/1990 | European Pat. Off. . |
| 0 469 819 | 2/1992 | European Pat. Off. . |
| 0 509 666 | 10/1992 | European Pat. Off. . |
| 1114630 | 10/1961 | Germany . |
| 648422 | 2/1994 | Japan .................................. 53/374.6 |
| 2 052 372 | 1/1981 | United Kingdom . |

*Primary Examiner*—James F. Coan
*Assistant Examiner*—Gene Kim
*Attorney, Agent, or Firm*—Spencer & Frank

[57] ABSTRACT

Two holders (27–30) arranged on both sides of the midplane (4) of a conveyed tubular bag (1) are rotated in parallel directions by crank mechanisms (15–18). A sealing jaw (37) or matching jaw (38) is vertically guided in the holders (27–30) and prestressed by a spring (41) against a stop (44). Stopping rollers (62) project sideways from the jaws (37, 38) and bump against supporting strips (48, 49) before the jaws (37, 38) touch each other. The supporting strips (48, 49) are moved against each other by a controller (54) in such a way that the vertical components of motion of the jaws are delayed in a controlled manner. On the contrary, before the jaws (37, 38) are moved away from each other, they are accelerated up to the required vertical speed to bump softly against the stop (44). This device works without noise, is gentle to the material and may be adapted to various working conditions.

10 Claims, 2 Drawing Sheets

TRANSVERSE SEALING APPARATUS FOR A TUBULAR BAG PACKAGING MACHINE

From U.S. Pat. No. 2,467,879, an apparatus for the transverse sealing of tubular bags is known. The two cooperating transverse sealing jaws are each seated on a support so as to be resilient, which support orbits on a circular path respectively by means of a parallelogram crank mechanism. While orbiting, the two sealing jaws remain parallel to one another. This accomplishes the production of the sealing seam over a certain feed section of the packaging tube. Thus, higher cadences can be accomplished compared to conventional, cylinder segment-shaped, orbiting sealing jaws, e.g., according to EP-A-399 948. However, the transverse sealing apparatus causes more noise than conventional transverse sealing apparatuses.

It is the object of the present invention to modify a transverse sealing apparatus of the type mentioned at the outset in such a way that it produces less noise during operation. This object is accomplished by the combination of features of the claims.

Figure 2:
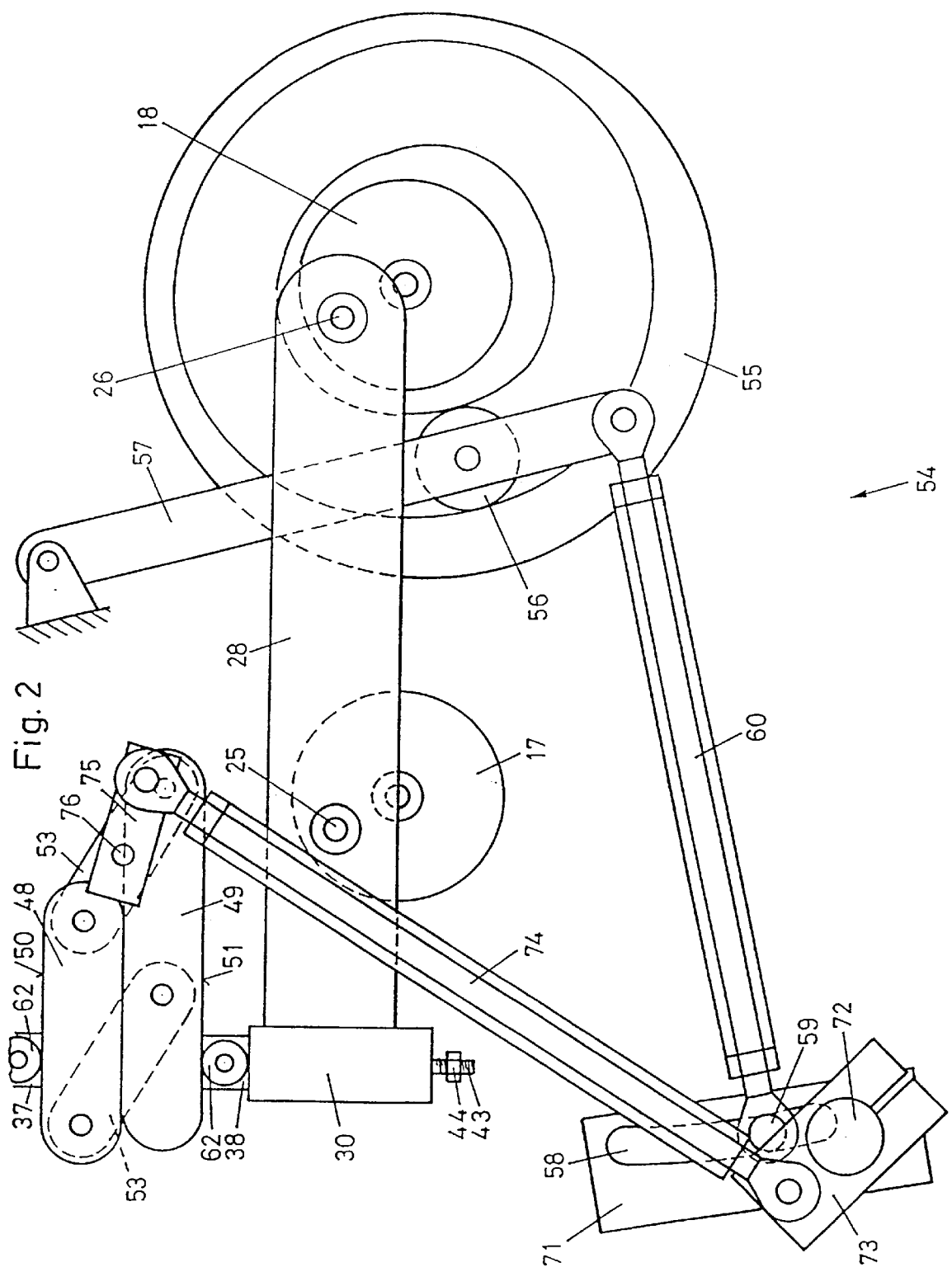

In the following, an embodiment of the invention is explained by way of the Figures. These show:

FIG. 1 a schematic side view of a transverse sealing apparatus, and FIG. 2 a section of a variant of the apparatus according to FIG. 1.

A side view of an apparatus 10 according to the invention is shown in FIG. 1. With means that are not shown, e.g., according to EP-A-399 948, a packaging tube 1 is fed which comprises products 2 at regular intervals. Transverse sealing seams 3 are formed with the apparatus 10 between the products 2 in the center plane 4 of the tube 1 and cut through in the middle. The individual packages 5 are carried away on a conveyor belt 6 in the conveying direction A.

On respectively two upper and lower shafts 11, 12, 13, 14, which are spaced apart from one another, a total of four crank wheels 15–18 are mounted which are all synchronously driven by a drive motor 19. The upper wheels 15, 16 run counterclockwise, the lower wheels run clockwise. The gear linkages between motor 19 and wheels 15–18 are indicated symbolically by chains 20 and a gear train 21. The wheels 15–18, which have at least approximately a uniform radius 22 from the shafts 11–14, carry axis-parallel pins 23–26. An upper support 27 is circulatingly seated on the pins 23, 24 of the upper wheels 15, 16 such that it at least approximately forms a parallelogram with the crank radii 22 and the connecting line between the shafts 11, 12 so that the support 27 orbits parallel to itself when the wheels 15, 16 are running. A lower support 28 is likewise fastened to the pins 25, 26. The upper support 27 and the lower support 28 each carry a transverse bar 29, 30 on their back end face. The transverse bars 29, 30 are guided on the supports 27, 28 so as to be displaceable in height and can be adjusted by means of screws 31. In an appropriate position, the transverse bars 29, 30 may also be fixedly connected to the supports 27, 28.

In the bars 29, 30, a sealing jaw 37 or an opposite jaw 38 are guided so as to be displaceable in height. The jaws 37, 38 have a parallel, plane sealing surface 39 or opposite surface 40 and are biased by several springs 41 in the direction toward the center plane 4. In the center, one of the jaws 37, 38 is provided with a knife, not shown, for separating the tube 1 during sealing. Respectively two guide rods 42 are fastened to the jaws 37, 38, which guide rods project beyond the bars 29, 30 and are provided with a thread 43 on their free end onto which an adjustment nut 44 is screwed. By adjusting the screws 31 and nuts 44, it is possible to set the rotational angle of the wheels 15–18 at which the surfaces 39, 40 arrive into contact, thus also the path segment during which the sealing takes place. In addition, the bias of the springs 41 and, therewith, the sealing pressure can be set with these adjusting means. In the place of springs 41, pressurized air or a different fluid can also be used as pressing element.

To prevent the two jaws 37, 38 from striking one another, respectively two supporting strips 48, 49 with plane supporting surfaces 50, 51 parallel to the center plane 4 are guided on both sides so as to be movable perpendicularly to the center plane 4. In the schematic illustration of FIG. 1, one leg 52 projects from each supporting strip 48, 49. The two legs 52 are connected to one another by means of two parallelogram levers 53, which are pivotably seated in their center, with which levers they form two parallelogram joints. The one of the two legs 52 is operated by a control device 54. In the illustrated example, the control device is comprised of a cam plate 55 that is rigidly connected with the wheel 17; on the cam plate, a roller 56 rolls on the one end of a two-armed, pivotably seated lever 57. The other arm of the lever 57 has an elongated hole 58 in which the one joint 59 of a toggle link 60 can be fastened so as to be adjustable. The other joint 61 of the rod 60 is connected to the one leg 52. On both sides, stop rollers 62 project from the jaws 37, 38, which stop rollers are rotatably seated on the jaws 37, 38 around axes which are parallel to the center plane 4 and perpendicular to the feed direction A.

When the crank wheels are turning, the bars 29, 30 orbit counter to one another but parallel to themselves on circular paths. The cam plate 55 moves the supporting strips 48, 49 in the same cadence away from one another and towards each other. The cam plate 55 is configured such and the adjusting means 31, 44, 58, 59 are set such that the rollers 62 impact the supporting surfaces 50, 51 at no or at low relative speed of the motion component perpendicularly to the center plane 4 before the jaws 37, 38 arrive at the tube 1 for pressing contact. Upon impact of the rollers 62, the strips 48, 49 move toward one another. Immediately after impact, the movement of the strips 48, 49 toward one another is delayed such that the jaws 37, 38 arrive at the tube for gentle pressing contact. Then, the strips 48, 49 are still moved slightly further toward one another so that the jaws 37, 38 press against the tube with the bias force of the springs 41. During further turning, the jaws 37, 38 are pressed into the bars 29, 30 until the dead point is reached which is illustrated in FIG. 1. Afterwards, the jaws 37, 38 move out again until the nuts 44 come to rest against the bars 29, 30. Just before this moment, the strips 48, 49 are moved apart again at increasing speed while being controlled by the cam plate 55 so that the jaws 37, 38 are accelerated approximately to the speed component perpendicular to the center plane 4, which they have at the time of impact of the nut 44.

This configuration largely prevents the jaws 37, 38 from striking one another as well as the nuts 44 from striking the jaws 29, 30. This reduces the noise considerably and the stress on the material is kept low because the influence of the inertial forces is reduced. This increases the operational reliability. Also, the path segment across which the jaws 37, 38 press against one another can be lengthened. In this manner, higher passage speeds or a longer and more even thermal transmission onto the tube 1, and thus a better sealing quality, can be accomplished. The adjustment to different operational conditions, e.g., different thicknesses of the wrapping material film of the tube 1, is possible in a simple manner. The current supply for the sealing jaws is simple because slip rings are not required.

Instead of through a cam disk 55, the strips 48, 49 can also be controlled by a servo lifting motor 65 which is program-controlled by a control device, not shown, wherein the output of a rotational angle transmitter 66 serves as reference signal, which output is connected to one of the wheels 18 or to the motor 19. This variant is indicated in FIG. 1 in dash-dot lines. It offers the advantage that the path of motion of the strips 48, 49 can be adjusted easily by changing the program.

As an additional adjustment option, the bearings of the axes 11–14 can be configured to be adjustable transversely to the center plane 14.

FIG. 2 illustrates a variant of the control device 54. Here, the cam plate 55 is fastened to the one of the wheels 18 on the one side of the machine. The toggle link 60 operates a lever 71. The lever 71 is seated on a shaft 72 so as to be fixed against rotation, which shaft extends across the width of the machine. The lever is provided with the elongated hole 58 in which the joint 59 is fastened so as to be adjustable. On both sides, a further lever 73 is respectively fastened on the shaft 72. By a toggle link 74 each, the levers 73 are connected to a further lever 75 which is connected with the pivot axis 76 of the one parallelogram lever 53 so as to be fixed against rotation. The levers 53 are linked directly to the supporting strips 48, 49 for forming a parallelogram linkage.

I claim:

1. A transverse sealing apparatus for sealing a packaging tube (1), in particular, for a tubular bag packaging machine, comprising two drive units (15–21) arranged on opposite sides of a center plane (4) of the packaging tube (1), which drive a first and second holder (27–30) to be circulating synchronously and counter to one another, a sealing jaw (37), which is guided in the first holder (27, 29) so as to be displaceable and biased by a first contact pressure element (41) against a first stop (44), from which sealing jaw is projecting a first stop element (62), an opposite jaw (38), which is guided in the second holder (28, 30) so as to be displaceable and biased by a second contact pressure element (41) against a second stop (44), from which opposite jaw is projecting a second stop element (62), two movable supporting elements (48, 49) with supporting surfaces (50, 51), a control device (54) for moving the supporting elements (48, 49) in such a way that the first and second stop element (62) run onto the associated supporting surface (50, 51) before the sealing jaw (37) and the opposite jaw (38) impact the tube (1) for pressing contact, and that the two supporting elements (48, 49) are subsequently moved toward one another to delay the motion component perpendicularly to the center plane of the sealing jaw (37) and of the opposite jaw (38) in a guided manner.

2. An apparatus according to claim 1, wherein the control elements (54) are configured such that the supporting elements (48, 49) are moved against the first and second stop element (62) for the contact of the supporting surfaces (50, 51) before the sealing jaw (37) lifts off from the opposite jaw (38), and that the sealing jaw (37) and opposite jaw (38) are accelerated to an increasingly higher speed transversely to the center plane (4).

3. An apparatus according to claim 1, wherein the drive units (15–21) are configured such that the sealing side (39) of the sealing jaw (37) is always oriented toward the opposite side (40) of the opposite jaw (38).

4. An apparatus according to claim 3, wherein the first and second holder (27, 28) is respectively rotatably seated on two circulating, synchronously driven cranks (15–18) having crank radii (22) of approximately identical length.

5. An apparatus according to claim 4, wherein the length of the supporting surfaces (50, 51) is at least 0.05 of the crank radius (22) and the supporting surfaces (50, 51) are preferably plane.

6. An apparatus according to claim 1, wherein the two stop elements (62) are configured as rollers which project laterally from the sealing jaw (37) or the opposite jaw (38) and are seated so as to be rotatable around axes parallel to the center plane (4).

7. An apparatus according to claim 1, wherein each supporting element (48, 49) is a member of respectively a parallelogram joint (48, 49, 53) of which one leg each is drive-connected with the control device (54).

8. An apparatus according to claim 1, wherein the rotational center of the sealing jaw (37) and of the opposite jaw (38) is adjustable transversely to the center plane (4).

9. An apparatus according to claim 1, wherein the control device (54) has adjusting means (58, 59).

10. An apparatus according to claim 1, wherein the stops (44) and the bias of the sealing jaw (37) and of the opposite jaw (38) are adjustable.

* * * * *